(12) United States Patent
Constantz

(10) Patent No.: US 7,501,046 B1
(45) Date of Patent: *Mar. 10, 2009

(54) SOLAR DISTILLATION LOOP EVAPORATION SLEEVE

(75) Inventor: James Edward Constantz, Portola Valley, CA (US)

(73) Assignee: The United States of American, as represented by the Secretary of the Interior, Washington, DC (US)

(*) Notice: Subject to any disclaimer, the term of this patent is extended or adjusted under 35 U.S.C. 154(b) by 766 days.

This patent is subject to a terminal disclaimer.

(21) Appl. No.: 11/122,204

(22) Filed: May 4, 2005

Related U.S. Application Data

(63) Continuation-in-part of application No. 10/729,265, filed on Dec. 3, 2003, now Pat. No. 7,108,769.

(51) Int. Cl.
*B01D 3/04* (2006.01)
*C02F 1/14* (2006.01)

(52) U.S. Cl. .................. 203/10; 159/16.1; 159/903; 202/188; 202/234; 202/237; 202/238; 203/49; 203/DIG. 1

(58) Field of Classification Search .......... 159/16.1, 159/903, 904, DIG. 15; 202/188, 234, 237, 202/238, 266, 267.1; 203/10, 49, 86, DIG. 1
See application file for complete search history.

(56) References Cited

U.S. PATENT DOCUMENTS

| | | | |
|---|---|---|---|
| 3,290,230 A | 12/1966 | Kobayashi | |
| 4,292,136 A | 9/1981 | Clavier | |
| 4,344,824 A | 8/1982 | Soleau, Jr. | |
| 4,459,177 A | 7/1984 | O'Hare | |
| 4,504,362 A | 3/1985 | Kruse | |
| 4,698,135 A | 10/1987 | Raab | |
| 4,738,742 A * | 4/1988 | Shishkin et al. | 156/391 |
| 4,882,071 A | 11/1989 | Bench et al. | |
| 5,067,272 A | 11/1991 | Constantz | |
| 5,101,593 A | 4/1992 | Bhatt | |
| 5,316,626 A | 5/1994 | Guy | |
| 5,409,578 A | 4/1995 | Kaneko | |
| 5,552,022 A * | 9/1996 | Wilson | 202/176 |
| 5,598,661 A | 2/1997 | Eiderman et al. | |
| 6,673,213 B2 | 1/2004 | Burgos | |
| 7,320,364 B2 * | 1/2008 | Fairbanks | 166/302 |
| 2006/0272933 A1 * | 12/2006 | Domen et al. | 203/10 |

* cited by examiner

*Primary Examiner*—Virginia Manoharan
(74) *Attorney, Agent, or Firm*—Mark Homer; C. Joan Gilsdorf

(57) ABSTRACT

An evaporation sleeve is placed within a solar distillation loop apparatus to increase the amount of water evaporated by the apparatus. The evaporation sleeve is rotationally attached within the above ground portion of the solar distillation loop so the sleeve lifts impure water into the air flow within the system. The evaporation sleeve significantly increases the water surface area available to the air flow within a solar distillation loop.

19 Claims, 2 Drawing Sheets

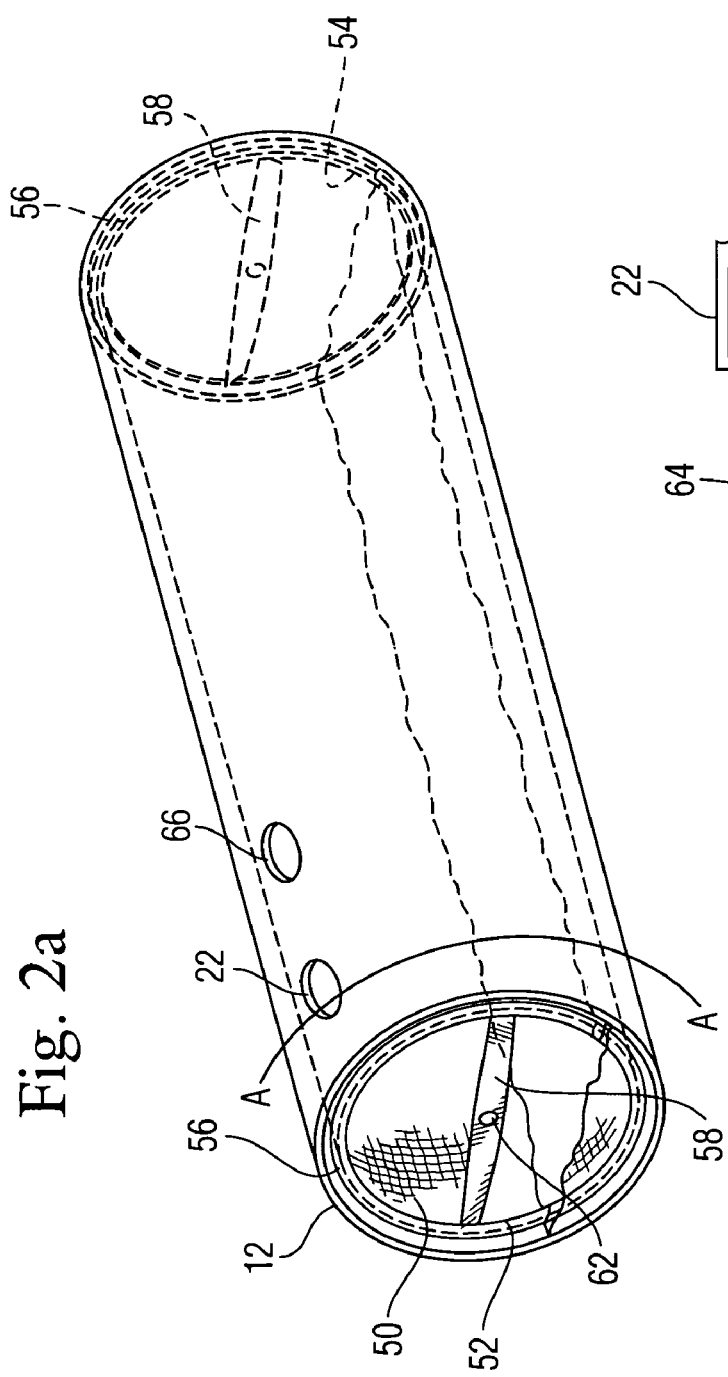
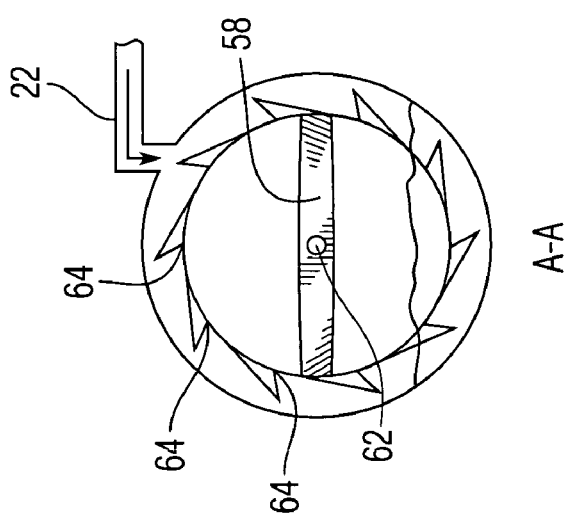

SOLAR DISTILLATION LOOP EVAPORATION SLEEVE

CROSS-REFERENCE TO RELATED APPLICATION(S)

The present application is a continuation-in-part of U.S. patent application Ser. No. 10/729,265, now U.S. Pat. No. 7,108,769 entitled "SOLAR DISTILLATION LOOP" filed on Dec. 3, 2003, which is incorporated by reference herein.

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

This invention relates in general to providing water in semi-arid and arid regions, more particularly to providing purified water from impaired water sources in semi-arid and arid regions, and most particularly to providing purified water from impaired water sources in semi-arid and arid regions through solar distillation.

2. Description of the Related Art

In previously filed application Ser. No. 10/729,265 for a solar distillation loop, to which this application is a continuation-in-part, problems related to exploiting certain impaired water sources in semi-arid and arid regions was discussed. These problems related to unacceptable water quality of many water sources in these regions and high energy/conveyance costs to use these water sources for irrigation or other purposes within these regions.

To address these issues, the inventor herein developed a solar distillation loop invention that was disclosed and claimed in the above referenced application. In general, operation of the invention works as follows.

A solar distillation loop is a chemical process that occurs in a drainage pipe system designed to purify salt water, or other impaired water, and distribute the purified water below the surface of the ground at a shallow depth for the purposes of subsurface irrigation or ground-water recharge. Alternatively, a slight variation in the drainage pipe system design redirects the purified water to a storage tank for use as a potable drinking water source.

The invention utilizes sea water, drainage water, sewage effluent, or other impaired water and converts this solution into pure water for use as a source of subsurface irrigation, ground-water recharge or as a source of drinking water. The purification process is a low energy method of water purification, because the water purification process requires solar energy for separation of impurities from the water, as well as the redistribution of the purified water. Solar energy is used as a source of thermal energy to evaporate water from the impaired water solution. Solar energy is also used to generate a direct-current power source to drive fans within the solar distillation loop to distribute the pure water vapor to an appropriate location for condensation and utilization.

The process of solar distillation of impaired water, where water vapor is evaporated from an impaired water body and condensed elsewhere, is carried out within a solar distillation loop. Within a solar distillation loop, the process of solar distillation is greatly accelerated due to: 1) the use of solar-powered fans within the solar distillation loop, and 2) the natural vertical thermal gradient that exists near the ground surface. The circulation created by the solar fans continually reduces the water vapor pressure above the impaired water, which accelerates water evaporation from the impaired water. The natural thermal gradient accelerates the condensation of pure water for the purposes of either subsurface irrigation, ground-water recharge, or a source of potable water.

In utilizing a solar distillation loop, the amount of impaired water that can be purified is directly related to the water surface area available for evaporation. Therefore, it is desired to provide a device and method for increasing the available surface area for evaporation within a solar distillation loop.

SUMMARY OF THE INVENTION

The invention proposed herein comprises a device to improve the operation of a solar distillation loop apparatus. The device is an evaporation sleeve placed within the solar distillation loop apparatus that increases the water evaporation area. By increasing the water evaporation area within the apparatus, the amount of evaporated water produced by the apparatus is increased.

Accordingly, it is an object of this invention to provide an improved solar distillation loop apparatus.

It is a further object of this invention to provide a device that increases the water evaporation area within a solar distillation loop apparatus.

This invention meets these and other objectives related to improved operation of a solar distillation loop apparatus by providing a device and method to increase the water evaporation area within the loop. The invention is an evaporation sleeve that is placed within the portion of a solar distillation loop that is above ground wherein the impure water flows. The evaporation sleeve is an open-ended tubular-shaped section that is rotationally attached within the above ground portion of the solar distillation loop. When the solar fans operate and the impure water flows within this portion of the solar distillation loop, the evaporation sleeve rotates, thereby lifting the impure water and providing a significant increase in the water evaporation area within the loop. In turn, the amount of water evaporated by the system is increased.

Preferably, the evaporation sleeve section is made of a nylon mesh material that is supported by at least two support rings over the open ends of the sleeve with at least two spokes substantially across the diameters of the support rings.

BRIEF DESCRIPTION OF THE DRAWINGS

In the drawings, which are not necessarily to scale, like or corresponding parts are denoted by like or corresponding reference numerals.

FIG. 2a is a cut-away section of the above ground pipe of a solar distillation loop with an embodiment of the evaporation sleeve of the present invention therein.

FIG. 2b is a side view of cut away A-A from FIG. 2a.

DESCRIPTION OF PREFERRED EMBODIMENTS

Figure 1:
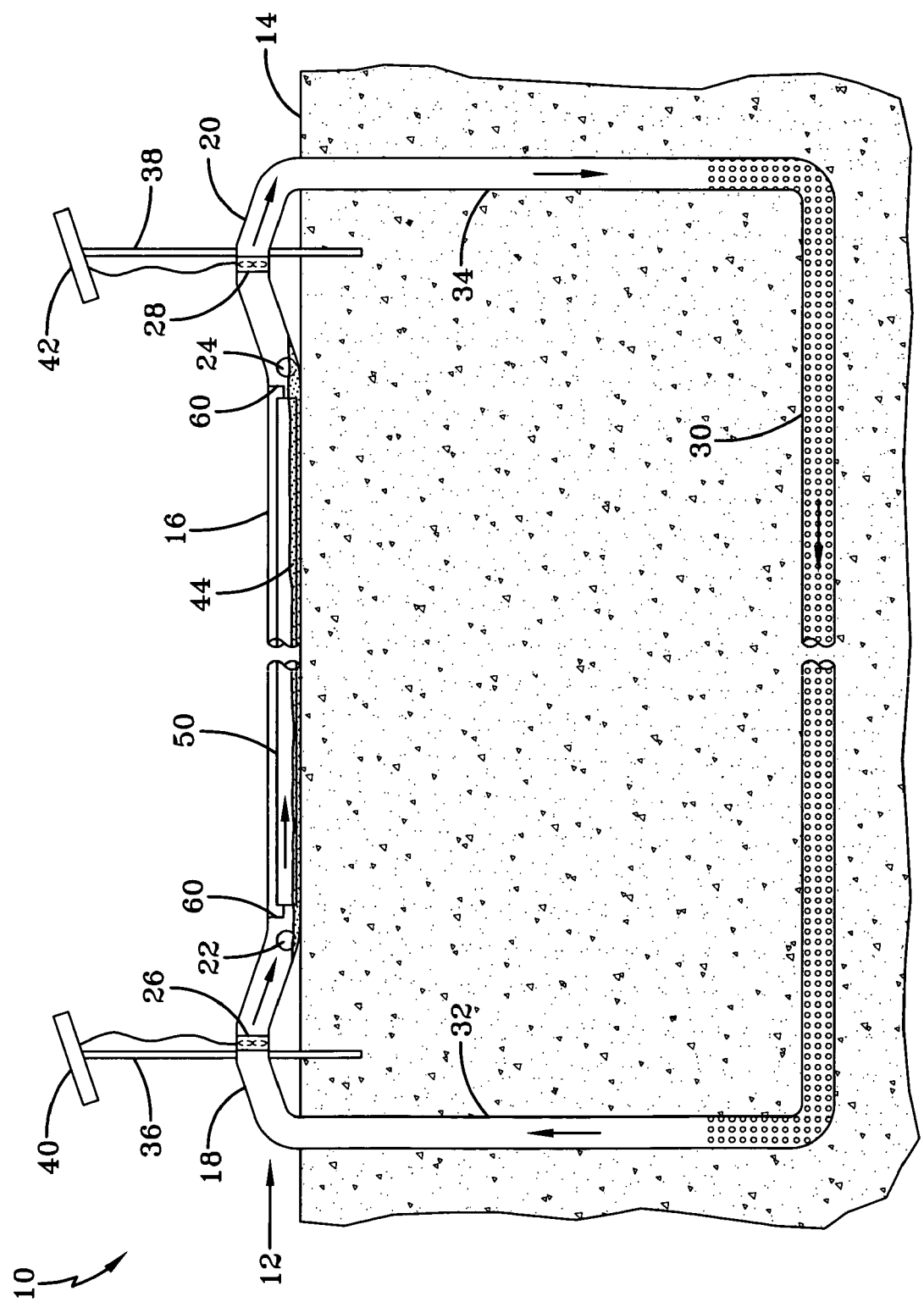
FIG. 1 is a cut-away side view of a solar distillation loop employing an embodiment of the present invention.

The invention, as embodied herein, comprises an evaporation sleeve that is placed within a solar distillation loop apparatus to increase the amount of water evaporated by the apparatus. The evaporation sleeve significantly increases the water surface area available within the solar distillation loop.

The operation of a solar distillation loop apparatus is described in detail in application Ser. No. 10/729,265, filed on Dec. 3, 2003. Referring to FIG. 1, the general operation is as follows. Loop 10 comprises a first pipe section 12 disposed on the ground surface 14. The first pipe section 12 includes a substantially straight portion 16 and elevated portions 18, 20 on each end of the substantially straight portion 16. An impure water inflow coupling 22 is located at one end of the straight portion 16 and an impure water outflow coupling 24 is located at the other end of the straight portion. Solar powered fans 26, 28 are disposed in each of the elevated portions 18, 20 of the first pipe section 12.

A second pipe section 30 is disposed under the ground surface 14 beneath the first pipe section 12. Two substantially vertical pipe sections 32, 34 connect respective ends of the second pipe section 30 to respective ends of the first pipe section 12. Pipe sections 12, 30, 32, 34 form a closed loop of pipe with first pipe section 12 residing on the soil surface 14 and second pipe section 30 buried below the ground surface 14. Second pipe section 30 is perforated and buried at a depth of about 1 to about 3 meters below the ground surface 14 in an agricultural field or similar setting. The lower portions of the two vertical pipe sections 32, 34 may also be perforated.

Above-ground first pipe section 12 has substantially the same length as buried second pipe section 30. Buried second pipe section 30 is connected to first pipe section 12 by vertical pipe sections 32, 34 that emerge at ground surface 14 on either end of the agricultural field or similar setting. Both ends of first pipe section 12 include elevated portions 18, 20 each containing a solar powered fan 26, 28. Elevated portions 18, 20 may be supported by attachment to posts 36, 38. Posts 36, 38 also support solar panels 40, 42 that provide DC power to the solar powered fans 26, 28.

Solar powered fans 26, 28 are oriented in the solar distillation loop 10 to force air in a circular fashion through the loop 10 during daylight hours. Fan 26 forces air along the first pipe section 12 and optional fan 28 forces air down vertical pipe section 34 into the buried second pipe section 30. In the straight portion 16 of the above-ground first pipe section 12, a shallow layer of impaired or impure water 44 flows into the straight portion 16 at one end via impure water inflow coupling 22. Impure water is removed from the other end of the straight portion 16 via impure water outflow coupling 24. In the manner of an irrigated field, the ground surface 14 has a slight slope from inflow coupling 22 to outflow coupling 24. Depending on the topography of the land, pumps may be used to supply the inflow water and/or remove the outflow water.

During the day, the air space in the straight portion 16 of the first pipe section 12 rapidly reaches water-vapor saturation. The solar powered fans 26, 28 quickly force this water vapor below ground into second pipe section 30. The saturated air is quickly cooled at depth in the buried second pipe section 30, causing water vapor to condense either in the second pipe section 30 or immediately outside it. Meanwhile, the impure water in the straight portion 16 is replenished and/or removed as needed by the inflow and outflow couplings 22, 24 connected to inflow and outflow pipes (not shown). The inflow and outflow pipes are either connected to additional parallel loops 10, or the inflow and outflow pipes are connected to inflow and outflow laterals in a similar fashion to irrigated agricultural fields.

The present invention improves the operation of the solar distillation loop apparatus described above. Referring to FIGS. 1, 2a, and 2b, the present invention comprises an evaporation sleeve 50. The sleeve 50 has two open ends 52, 54 and is tubular in shape. The sleeve 50 is placed within the straight portion 16 of the first pipe 12, substantially between the impure water inflow and outflow couplings 22, 24, and is rotationally attached 60 to the first pipe 12. The sleeve 50 should be attached to the first pipe 12 in a location so that a portion of the sleeve 50 contacts impure water flowing through the first pipe 12.

The length of the sleeve 50 may vary between a few meters to hundreds of meters depending upon the size of the solar distillation loop apparatus and may be selected by one skilled in the art. However, smaller size distillation loop systems, employing a smaller size sleeve 50, will obtain a greater benefit from the present invention due to the smaller overall water surface area available in a smaller system. The diameter of the sleeve 50 should be less than the diameter of the first pipe 12 so that the sleeve 50 may freely rotate within the first pipe 12.

The sleeve 50 should be constructed of a material that can lift the wastewater flowing through the lower portion of the first pipe 12 into the air flow within the first pipe 12 caused by the fans 26, 28. The air flow will go through and around the sleeve 50, allowing the flow to contact water lifted within the sleeve 50 and on outer surfaces of the sleeve 50, as well as the water flow along the bottom of first pipe 12. This lifting action provides for a significant increase in water surface area contacted by the air flow, and, in turn, increases the evaporation rate of distilled water produced by the loop apparatus. A preferred material for the sleeve 50 comprises a nylon mesh.

Because nylon mesh material, as well as many other materials that can be employed in constructing the sleeve, is not rigid, support rings 56 may be fitted over the open ends 52, 54 of the sleeve 50 to provide support. If additional support is required due to the length of the sleeve 50, additional support rings 56 may be employed at intervals along the length of the sleeve 50. The support rings can be made of any material that does not rust or break down readily in water such as ABS plastic or stainless steel.

For further support for the sleeve 50, and to provide part of a preferred embodiment of the rotational attachment 60 discussed further below, a spoke 58 may be placed substantially across the diameter of each of the support rings 56. The spoke may be made of the same material as the support rings 56. In a preferred embodiment, the spokes 58 are flat and twisted into a propeller type shape to assist in rotating the sleeve 50. Further, a hole 62 may be placed in the center of the spokes 58 in order to work with the rotational attachment 60.

The rotational attachment 60 should allow the sleeve 50 to rotate freely within the first pipe 12 and may be selected by one skilled in the art. Preferably, the rotational attachment 60 comprises two hangar like fittings attached to the first pipe 12 that are connected through the holes 62 of the spokes 58 so the sleeve 50 may rotate. Alternatively, a wire may be connected across the first pipe 12 and through the holes 62 to allow for sleeve 50 rotation. The materials used in the rotational attachment should be similar to those used for construction of the support rings 56 and spokes 58.

In one embodiment of the invention, a plurality of indentations 64 may be placed into the outer surface of the sleeve 50. The indentations 64 should all be placed at approximately the same angle so that the indentations 64 form a shape similar to a water wheel. In this embodiment, the impure water inflow coupling 22 is placed above an end 52 of the sleeve 50 so that the impure water flows on the edge of the outer surface of the sleeve 50. As the impure water flows over the indentations 64, the water flow rotates the sleeve 50. If greater water flow is necessary to rotate the sleeve 50, further water inflow ports 66 may be placed along the outer surface of the first pipe 12.

In operation, the sleeve 50 is attached within the first pipe 12 with a portion of the sleeve 50 contacting the impure water using a rotational attachment 60 to allow the sleeve 50 to freely rotate within the first pipe 12. Impure water flows from the inflow coupling 22 to the outflow coupling 24. The fans 26, 28 are also employed. Both the airflow from the fans 26, 28 and the impure water flow may provide impetus for the sleeve 50 to rotate. Because the spokes 58 are propeller shaped, they also assist in rotation. As the sleeve 50 rotates, the sleeve lifts impure water to areas within the sleeve 50 and external to the sleeve 50 within the first pipe 12. The air flow travels within the sleeve 50 and external to the sleeve 50, evaporating water it contacts within the first pipe 12. As described above, the surface area of the water that the air flow contacts is greatly increased due to water being lifted into the air flow along with the channel of water along the bottom of the first pipe 12.

What is described are specific examples of many possible variations on the same invention and are not intended in a limiting sense. The claimed invention can be practiced using other variations not specifically described above.

What is claimed is:

1. In a solar distillation loop apparatus comprising an evaporation section, solar powered fans, and a condensation section, the evaporation section having a first pipe section disposed on a ground surface, the first pipe section including a substantially straight portion and elevated portions on each end of the substantially straight portion, an impure water inflow coupling at one end of the straight portion and an impure water outflow coupling at the other end of the straight portion, the solar powered fans disposed in each of the elevated portions of the first pipe section, and the condensation section having a second pipe section disposed under the ground surface beneath the first pipe, section and two substantially vertical pipe sections that connect respective ends of the second pipe section to respective ends of the first pipe section, wherein solar energy heats the substantially straight portion to evaporate impure water therein, the improvement comprising:
    a sleeve having a tubular shape with open ends and a diameter less than a diameter of the first pipe section, disposed within the first pipe section between the solar powered fans and rotationally attached to the first pipe section, for increasing an evaporation surface area of the evaporation section.

2. The apparatus of claim 1, wherein the sleeve comprises a nylon mesh material.

3. In a solar distillation loop apparatus comprising an evaporation section, solar powered fans, and a condensation section, the evaporation section having a first pipe section disposed on a ground surface, the first pipe section including a substantially straight portion and elevated portions on each end of the substantially straight portion, an impure water inflow coupling at one end of the straight portion and an impure water outflow coupling at the other end of the straight portion, the solar powered fans disposed in each of the elevated portions of the first pipe section, and the condensation section having a second pipe section disposed under the ground surface beneath the first pipe section and two substantially vertical pipe sections that connect respective ends of the second pipe section to respective ends of the first pipe section, wherein solar energy heats the substantially straight portion to evaporate impure water therein, the improvement comprising:
    a sleeve having a tubular shape with open ends, disposed within the first pipe section between the solar powered fans and rotationally attached to the first pipe section, for increasing an evaporation surface area of the evaporation section; and
    at least two support rings placed over the open ends of the sleeve.

4. The apparatus of claim 3, further comprising at least two spokes attached across the at least two support rings.

5. The apparatus of claim 4, wherein each of the at least two spokes comprises a center hole.

6. The apparatus of claim 5, wherein each of the at least two spokes comprises a flat shape.

7. The apparatus of claim 6, wherein each of the at least two spokes further comprises a twisted configuration.

8. The apparatus of claim 7, wherein the sleeve is further disposed between the impure water inflow coupling and the impure water outflow coupling.

9. The apparatus of claim 8, wherein the sleeve is rotationally attached to the first pipe section by suspending the sleeve within the first pipe section using wires attached to the first pipe section and through the holes in the at least two spokes.

10. The apparatus of claim 7, wherein the sleeve further comprises a plurality of indentations on an outer surface of the sleeve.

11. The apparatus of claim 9, wherein the impure water inflow coupling is located above the sleeve so that impure water flows along the outer surface of the sleeve and over the indentations to assist in rotating the sleeve.

12. In a method of producing distilled water using a solar distillation loop comprising disposing a first pipe section on a ground surface, the first pipe section including a substantially straight portion and elevated portions on each end of the substantially straight portion, an impure water inflow coupling at one end of the straight portion and an impure water outflow coupling at the other end of the straight portion, disposing solar powered fans in each of the elevated portions of the first pipe section, disposing a second pipe section under the ground surface beneath the first pipe section, installing two substantially vertical pipe sections that connect respective ends of the second pipe section to respective ends of the first pipe section, providing impure water to the first pipe section via the impure water inflow coupling and removing impure water from the first pipe section via the impure water outflow coupling, evaporating water from the impure water in the substantially straight portion of the first pipe section by solar energy heating the substantially straight portion, using the solar powered fans to move the evaporated water from the first pipe section to the second pipe section, and condensing the evaporated water in the second pipe section, the improvement comprising:
    disposing an open-ended tubular section, having a diameter less than a diameter of the first pipe section, within the first pipe section between the impure water inflow coupling and the impure water outflow coupling and rotationally attaching the open-ended tubular section to the first pipe section wherein the open-ended tubular section rotates and lifts impure water when the solar powered fans operate.

13. The method of claim 12, wherein flow of the impure water within the first pipe section assists in rotating the open-ended tubular section.

14. A solar distribution loop apparatus, comprising:
    an evaporation section comprising
        a first pipe section disposed on a ground surface, the first pipe section including a substantially straight portion and elevated portions on each end of the substantially straight portion, an impure water inflow coupling at one end of the straight portion, an impure water outflow coupling at the other end of the straight portion, and a sleeve having a tubular shape with open ends and a diameter less than a diameter of the first pipe section and being disposed within the first pipe section between the elevated portions and rotationally attached to the first pipe section, wherein solar energy heats the substantially straight portion to evaporate impure water therein;

a solar powered fan disposed in the elevated portion of the first pipe section adjacent to the impure water inflow coupling; and a condensation section comprising a second pipe section disposed under the ground surface beneath the first pipe section, and two substantially vertical pipe sections that connect respective ends of the second pipe section to respective ends of the first pipe section.

15. The apparatus of claim 14, wherein the sleeve comprises a nylon mesh material.

16. A solar distribution loop apparatus, comprising:

an evaporation section comprising a first pipe section disposed on a ground surface, the first pipe section including a substantially straight portion and elevated portions on each end of the substantially straight portion, an impure water inflow coupling at one end of the straight portion, an impure water outflow coupling at the other end of the straight portion, and a sleeve having a tubular shape with open ends and being disposed within the first pipe section between the elevated portions and rotationally attached to the first pipe section, the sleeve having at least two support rings over the open ends of the section, wherein solar energy heats the substantially straight portion to evaporate impure water therein;

a solar powered fan disposed in the elevated portion of the first pipe section adjacent to the impure water inflow coupling; and a condensation section comprising a second pipe section and two substantially vertical pipe sections, the second pipe section being disposed under the ground surface beneath the first pipe section, and the two substantially vertical pipe sections connecting respective ends of the second pipe section to respective ends of the first pipe section.

17. The apparatus of claim 16, further comprising at least two spokes attached across the at least two support rings.

18. The apparatus of claim 17, wherein each of the at least two spokes comprises a center hole.

19. The apparatus of claim 18, wherein each of the at least two spokes comprises a flat shape.

\* \* \* \* \*